United States Patent
Zhu et al.

(10) Patent No.: US 7,942,393 B2
(45) Date of Patent: May 17, 2011

(54) ANGLE ADJUSTING DEVICE AND DISPLAY MODULE TESTING APPARATUS USING THE SAME

(75) Inventors: Shu-Yan Zhu, Shenzhen (CN); Yun-Hui Huang, Shenzhen (CN)

(73) Assignees: Innocom Technology (ShenZhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 1062 days.

(21) Appl. No.: 11/788,162

(22) Filed: Apr. 19, 2007

(65) Prior Publication Data

US 2007/0257698 A1 Nov. 8, 2007

(30) Foreign Application Priority Data

Apr. 19, 2006 (CN) .................... 2006 2 0013638 U

(51) Int. Cl.
*B25B 1/22* (2006.01)
(52) U.S. Cl. .............. 269/75; 269/71; 269/73; 248/371; 33/568
(58) Field of Classification Search ............... 269/75, 269/71, 73, 60, 8, 136, 138, 902; 33/568, 33/569, 570; 108/6, 8; 312/305, 123, 125, 312/135, 265.5; 248/371, 398
See application file for complete search history.

(56) References Cited

U.S. PATENT DOCUMENTS

| | | | | | |
|---|---|---|---|---|---|
| 1,082,997 | A | * | 12/1913 | Braasch | 108/6 |
| 2,452,216 | A | * | 10/1948 | Yarber | 108/6 |
| 3,069,154 | A | * | 12/1962 | Zwick | 269/73 |
| 3,550,891 | A | * | 12/1970 | Scott | 248/242 |
| 3,606,450 | A | * | 9/1971 | Sedgwick | 297/149 |
| 3,641,946 | A | * | 2/1972 | Charnay | 108/6 |
| 3,910,576 | A | * | 10/1975 | Leonhart | 473/27 |
| 3,970,274 | A | * | 7/1976 | Resk | 248/185.1 |
| 4,154,173 | A | * | 5/1979 | Chesnut | 108/6 |
| 4,467,727 | A | * | 8/1984 | Strommer | 108/23 |
| 4,789,048 | A | * | 12/1988 | Cramer et al. | 186/61 |
| 4,924,843 | A | * | 5/1990 | Waren | 125/35 |
| 4,943,040 | A | * | 7/1990 | Finstad et al. | 269/69 |
| 5,253,429 | A | * | 10/1993 | Konno et al. | 33/568 |
| 5,669,599 | A | * | 9/1997 | Toh et al. | 269/8 |
| 5,794,541 | A | * | 8/1998 | Hirose | 108/20 |
| 6,220,179 | B1 | * | 4/2001 | Iskhakbayev | 108/6 |
| 6,353,466 | B1 | | 3/2002 | Park | |
| 6,408,526 | B1 | * | 6/2002 | Montesanti et al. | 33/1 M |
| 6,752,281 | B1 | * | 6/2004 | Mason et al. | 211/195 |
| 6,775,917 | B1 | * | 8/2004 | Campbell | 33/640 |
| 7,314,215 | B2 | * | 1/2008 | Vosoughkia | 269/296 |
| 2008/0303900 | A1 | * | 12/2008 | Stowe et al. | 348/143 |
| 2010/0095565 | A1 | * | 4/2010 | Ma et al. | 38/103 |

* cited by examiner

*Primary Examiner* — George Nguyen
(74) *Attorney, Agent, or Firm* — Wei Te Chung

(57) ABSTRACT

An exemplary device (27) for adjusting angle of a base plate (2710) includes: two side walls (21) being parallel to and spaced apart from each other, each of the side walls including a pivot hole (217); a base plate disposed between the two side walls and pivotally attached to the side walls via the pivot axles; and a plurality of magnetism members (211, 212 and 2715) disposed on the base plate (2710) and the side wall. The magnetism members configures for holding the base plate stably in a starting position and further configures to allow the base plate to be displaced from the starting position by manual pressure applied to the base plate, such that a tilt angle of the base plate relative to the two side walls is adjustable up or down as desired. An exemplary apparatus (2) for testing display modules using the angle adjusting device is also provided.

16 Claims, 5 Drawing Sheets

US 7,942,393 B2

ANGLE ADJUSTING DEVICE AND DISPLAY MODULE TESTING APPARATUS USING THE SAME

FIELD OF THE INVENTION

This invention relates to an angle adjusting device and a display module testing apparatus using the angle adjusting device.

BACKGROUND

In mass manufacturing of display products, such as LCD monitors, each display module should be tested to determine if it is defective or not. Once the display module has passed the test, it is ready to be assembled together with other parts of the LCD monitor.

FIG. 5 shows a conventional testing apparatus for display modules. The apparatus 10 includes a horizontal working table 11 and a carrier 12, which is obliquely mounted on the working table 11. The carrier 12 is generally rectangular in shape and is used for supporting a display module placed thereon. The carrier 12 may be set to maintain an angle anywhere in the range of 25 to 65 degrees, relative to the working table 11. Thus, an operator can select a suitable angle for the display module to be tested.

However, when the apparatus 10 is installed at a production line, the angle between the carrier 12 and the working table 11 is set or fixed. A fixed angle means that the operator cannot readily adjust the carrier 12 during the process of testing a display module, and he/she may have to adjust viewing angles himself/herself in some other way manually. That is, the carrier 12 is liable to cause inconvenience to the operator. If the angle between the carrier 12 and the working table 11 needs to be adjusted, the entire apparatus 10 may need to be rearranged. Rearranging the entire apparatus 10 requires time, requires manpower, and increases production costs.

Accordingly, what is needed is an angle adjusting device that can overcome the above-described deficiencies. What is also needed is a testing apparatus using the angle adjusting device, the testing apparatus being typically adapted for testing display modules.

SUMMARY

An exemplary device for adjusting a tilt angle of a base plate from a stable starting position, includes: two side walls being parallel to and spaced apart from each other, each of the side walls including a pivot hole; a base plate disposed between the two side walls and pivotally attached to the side walls via the pivot axles; and a plurality of magnetism members disposed on the base plate and the side wall. The magnetism members configures for holding the base plate stably in a starting position and further configures to allow the base plate to be displaced from the starting position by manual pressure applied to the base plate, such that a tilt angle of the base plate relative to the two side walls is adjustable up or down as desired.

An exemplary apparatus for testing display modules includes a base plate configured for holding at least one display module; a signal generating device, configured to be electrically connectable to the at least one display module; and a device for adjusting a tilt angle of the base plate from a stable starting position. The device includes: two side walls being parallel to and spaced apart from each other, each of the side walls including a pivot hole; a base plate disposed between the two side walls and pivotally attached to the side walls via the pivot axles; and a plurality of magnetism members disposed on the base plate and the side wall. The magnetism members are configured for holding the base plate stably in a starting position and further configured to allow the base plate to be displaced from the starting position by manual pressure applied to the base plate, such that a tilt angle of the base plate relative to the two side walls is adjustable up or down as desired.

Other novel features and advantages will become more apparent from the following detailed description when taken in conjunction with the accompanying drawings.

DETAILED DESCRIPTION OF PREFERRED EMBODIMENTS

References will now be made to the drawings to give detailed descriptions of various embodiments of the present invention.

Figure 1:
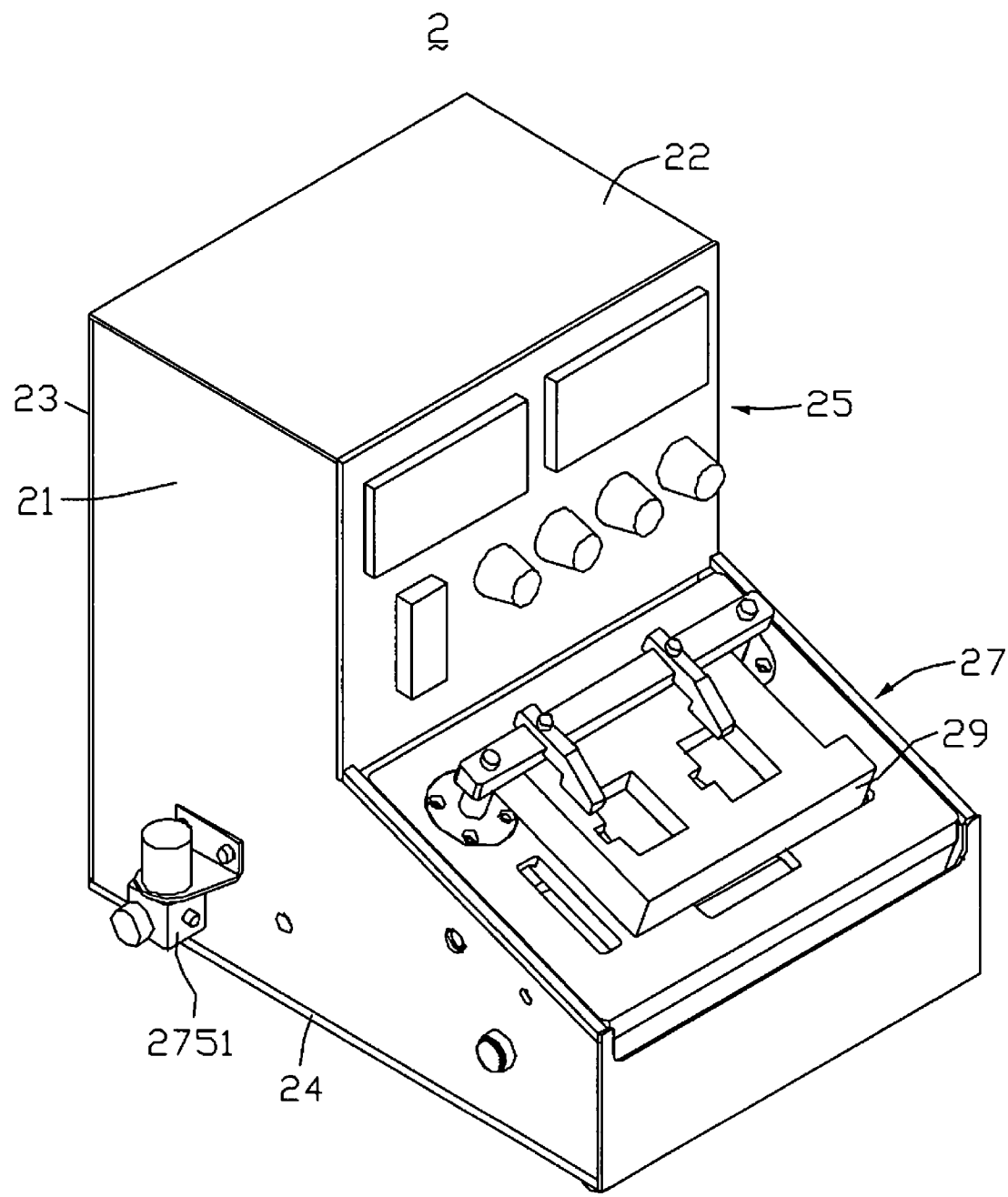
FIG. 1 is an isometric view of an apparatus for testing display modules, according to an exemplary embodiment of the present invention.

FIG. 1 shows an apparatus for testing display modules in accordance with an exemplary embodiment of the present invention. The apparatus 2 includes two L-shaped side walls 21, a top plate 22, a rear wall 23, a bottom plate 24, a signal generating device 25, an angle adjusting device 27 and a supporting plate 29. The two L-shaped side walls 21 are parallel to and spaced apart from each other. The top plate 22, the rear wall 23 and the bottom plate 24 are connected to edges of the side walls 21, respectively, to form a space for containing the signal generating device 25 and the angle adjusting device 27. The signal generating device 25 is adjacent to the rear wall 23 and the bottom plate 24, and is electrically connected with the angle adjusting device 27. The supporting plate 29 is pressingly held on the angle adjusting device 27.

Figure 2:
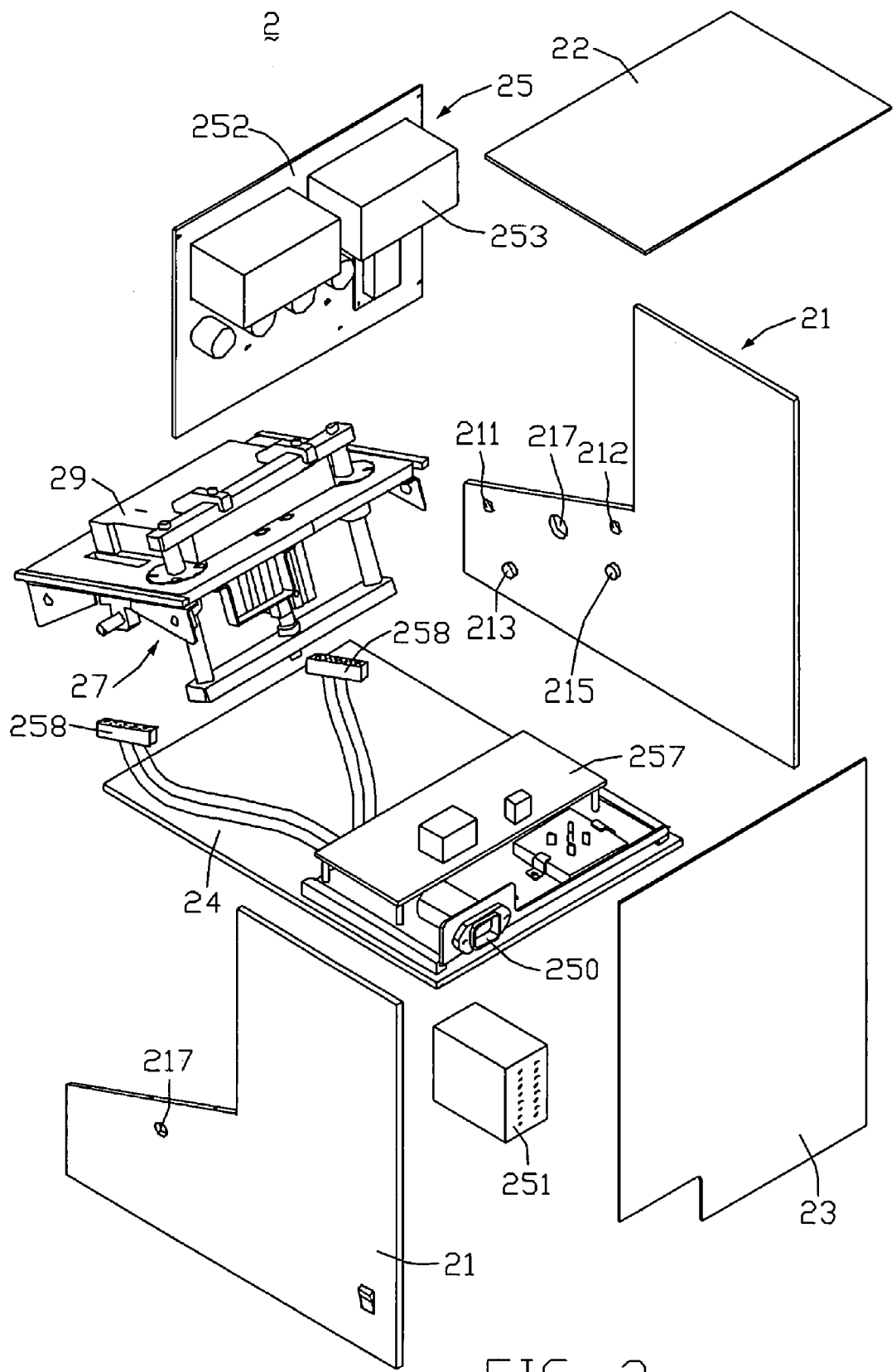
FIG. 2 is an exploded, isometric view of the testing apparatus of FIG. 1.

Referring to FIG. 2, an exploded isometric view of the testing apparatus 2 is shown. The two L-shaped side walls 21 are generally symmetrical in structure. Each of the two L-shaped side walls 21 includes a first and a second magnetism members 211 and 212, a first and a second blocks 213 and 215 generally adjacent to the first and second magnetism members 211 and 212, respectively, and a pivot hole 217 generally between the first and second magnetism members 211 and 212. The first and second magnetism members 211 and 212 are spaced apart from each other and generally adjacent to an intermediate slanted edge of the side wall 21. The first and second blocks 213 and 215 are also spaced apart from each other, and are nearer to a bottom edge of the side wall 21 than the first and second magnetism members 211 and 212. The first and second magnetism members 211 and 212 can for example be fixed magnets.

The signal generating device 25 includes a signal input socket 250, a power supply 251, a mainboard 252 having a plurality of meters 253 (such as a voltage meter and a current meter), a PCB (printed circuit board) 257, and two signal output sockets 258.

The signal input socket 250 can protrude out from the rear wall 23. The signal input socket 250 is for receiving voltage signals and transmitting the voltage signals to the power supply 251. The power supply 251 is electrically connected to the signal input socket 250. The power supply 251 can convert and transmit pre-determined voltage signals to the PCB 257 and the mainboard 252, respectively. The PCB 257 is disposed over the bottom plate 24, and the signal output sockets 258 are electrically connected to a controller (not labeled) of the PCB 257. The mainboard 252 is used as a front cover of the testing apparatus 2 and is rectangular in shape. The mainboard 252 includes the meters 253 for displaying parameters of all kinds of testing signals.

Figure 3:
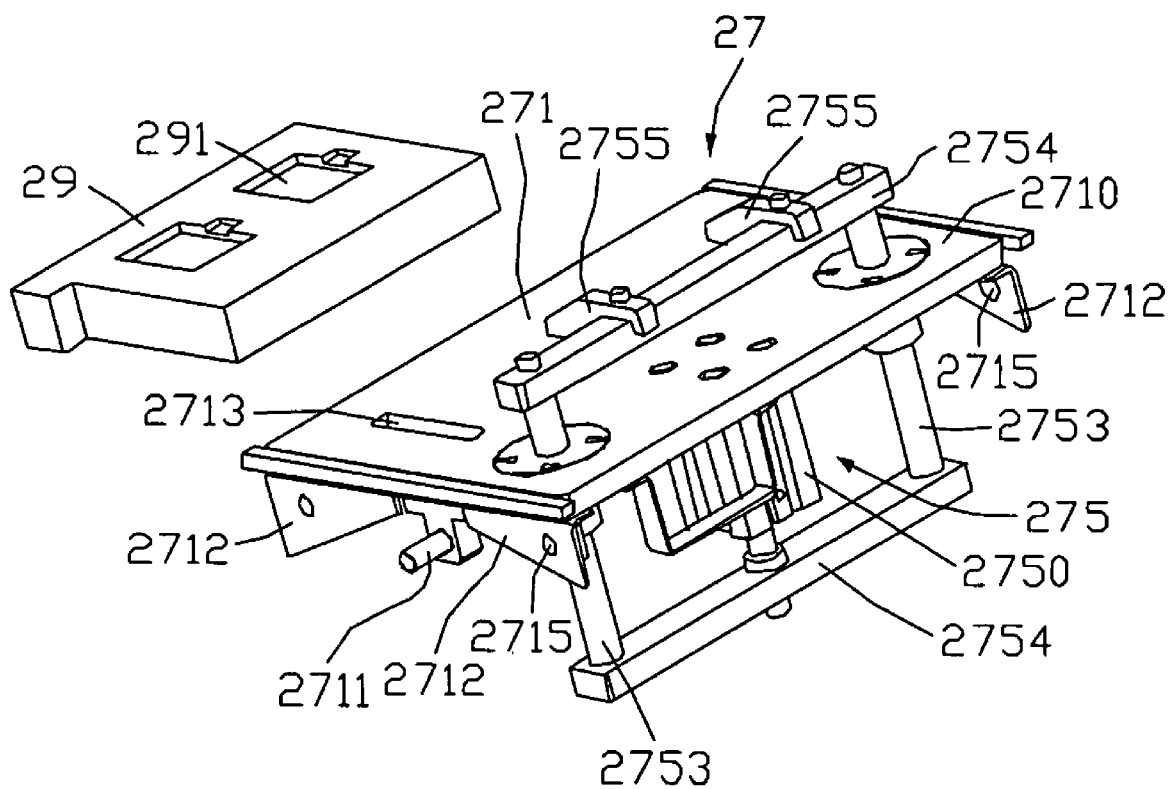
FIG. 3 is an exploded view of an angle adjusting device and a supporting plate of the testing apparatus of FIG. 1.

Referring to FIG. 3, an exploded view of the angle adjusting device 27 and the supporting plate 29 is shown.

The angle adjusting device 27 includes a supporting member 271 and a cylinder mechanism 275. The supporting member 271 includes a main plate 2710, two separate pivot axles 2711 at opposite lateral sides of the main plate 2710 respectively, four protrusions 2712, two through slots 2713, and four magnetism members 2715. The protrusions 2712 downwardly extend from opposite lateral side edges of the main plate 2710, and the pivot axles 2711 are laterally fixed under middle portions of the lateral sides of the main plate 2710 respectively. Each magnetism member 2715 is disposed at an outer face of a respective protrusion 2712, and corresponds to one of the first and second magnetism members 211 and 212 of the respective side wall 21. The magnetism members 2715 can for example be fixed magnets. The through slots 2713 are exposed at a top portion of the main plate 2710 and are used for containing the corresponding signal output sockets 258 of the signal generating device 25.

The cylinder mechanism 275 is typically a compressed air kind of cylinder mechanism, and includes a main body 2750, a compressed air switch 2751 (as shown in FIG. 1), two positioning posts 2753, two connecting posts 2754 and two pressing pieces 2755. The switch 2751 is attached to an outside of one of the two side walls 21 (as shown in FIG. 1). The connecting posts 2754 are disposed parallel to and spaced apart from each other, and the positioning posts 2753 are disposed parallel to and spaced apart from each other. The connecting posts 2754 and the positioning posts 2753, cooperatively, form a hollow frame (not labeled). The main body 2750 is fixed to a bottom one of the connecting posts 2754, and upper portions of the positioning posts 2753 are slidably engaged in the main plate 2710 of the supporting member 271. The pressing pieces 2755 are fixed to a top one of the connecting posts 2754. The cylinder mechanism 275 functions to slide the positioning posts 2753 relative to the main plate 2710. Thereby, the pressing pieces 2755 can be moved down toward the main plate 2710 in order to fix the supporting plate 29 on the main plate 2710.

The supporting plate 29 has a generally rectangular shape and defines two recesses 291. The supporting plate 29 can be fixed to the main plate 2710, with the supporting plate 29 being pressed by the pressing pieces 2755. The recesses 291 are used to contain display modules to be tested. The recesses 291 can be sized according to the display modules to be tested.

Figure 4:
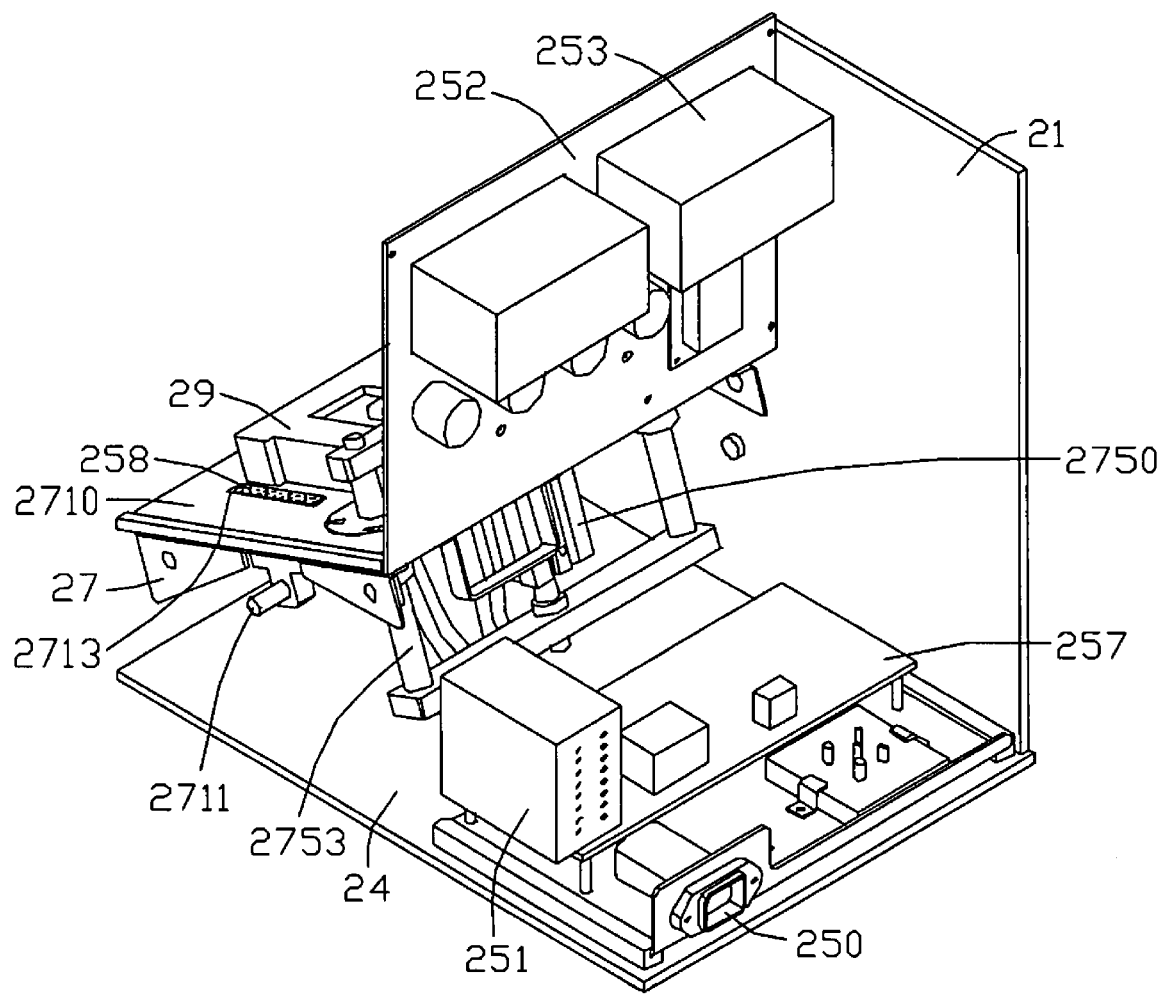
FIG. 4 is an assembled view of certain parts of the testing apparatus shown in FIG. 2.
Figure 5:
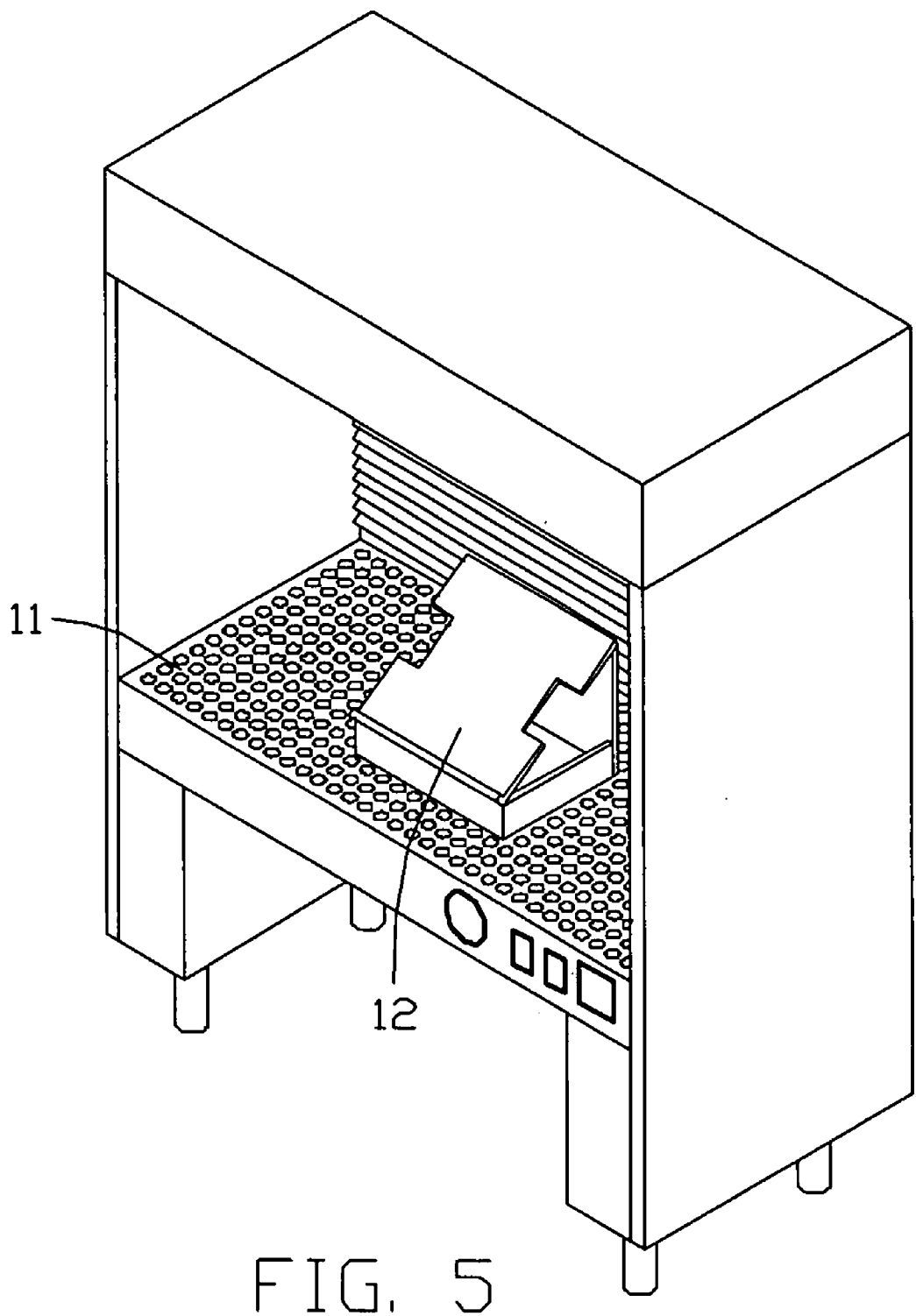
FIG. 5 is an isometric view of a conventional apparatus for testing display modules.

Referring also to FIG. 4, once the apparatus 2 has been assembled, the pivot axles 2711 are pivotably engaged in the two pivot holes 217 (as shown in FIG. 2) respectively, such that the angle adjusting device 27 is pivotably attached to the side walls 21. The main plate 2710 is tiltable by means of the pivot axles 2711 pivoting in the pivot holes 217. The main plate 2710 is held in a main position in which the first and second magnetism members 211 and 212 are positioned directly opposite the magnetism members 2712, 2715 respectively. The switch 2751 can be activated by an operator to drive the cylinder mechanism 275 (as shown in FIG. 3). The cylinder mechanism 275 causes the positioning posts 2753 to slide down relative to the main plate 2710. Thus the pressing pieces 2755 press down on the supporting plate 29, such that the supporting plate 29 is fixed on the main plate 2710. The signal output sockets 258 are contained in corresponding through slots 2713. The signal output sockets 258 can be electrically connected to the display modules to be tested by wires (not shown), so that display signals can be transmitted to the display modules to be tested.

In operation, the supporting plate 29 is placed on the main plate 2710 and is pressed by the pressing pieces 2755. Thereby, the supporting plate 29 is fixed on the main plate 2710. Display modules to be tested are disposed in the recesses 291 of the supporting plate 29, and are electrically connected to the signal output sockets 258 by the wires (not shown). Thereby, the display modules are able to display test images. At any time during testing of the display modules, the main plate 2710 can be displaced from the main position by manual pushing by an operator, so that the main plate 2710 either tilts back or tilts up as desired. The degree of tilting up or tilting back is limited by the respective protrusions 2715 reaching the respective blocks 213, 215. This tilting of the main plate 2710 is temporary, and can only be maintained by the operator continuing to push the main plate 2710. When the operator releases the main plate 2710, the main plate 2710 returns to the main position automatically, either under its own weight or by attraction between the first and the second magnetism members 211, 212 and the magnetism members 2715.

In summary, the apparatus 2 includes the angle adjusting device 27. The angle adjusting device 27 enables the operator to easily and conveniently adjust the angle and/or position of the supporting plate 29 during the testing process.

In addition, the operator may switch the switch 2751 to release the supporting plate 29 or lock the supporting plate 29 in position. That is, the operator may conveniently change any one supporting plate 29 with another different supporting plate 29 having different recesses 291. Thereby, the operator can test display modules having different sizes.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A device for adjusting a tilt angle of a base plate from a stable starting position, comprising:

two side walls being parallel to and spaced apart from each other, each side wall comprising a pivot hole;

the base plate disposed between the two side walls and pivotally attached to the side walls via the pivot holes; and a plurality of magnetism members disposed on the base plate and the side walls, respectively, the magnetism members configured for holding the base plate stably in a starting position and further configured to allow the base plate to be displaced from the starting position by manual pressure applied to the base plate, such that a tilt angle of the base plate relative to the two side walls is adjustable up or down as desired.

2. The device as claimed in claim 1, wherein each of the side walls comprises two of the magnetism members thereat, and the magnetism members at the side wall are spaced apart from each other.

3. The device as claimed in claim 2, wherein the pivot hole of each of the side walls is formed at a middle portion of the side wall between the two magnetism members.

4. The device as claimed in claim 3, wherein the base plate comprises other of the magnetism members, said other of the magnetism members corresponding to the magnetism members of the side walls.

5. The device as claimed in claim 2, wherein each of the side walls further comprises two blocks under the corresponding magnetism members respectively, the blocks being nearer to a bottom edge of the side wall than the corresponding magnetism members.

6. The device as claimed in claim 5, wherein blocks are positioned and configured to prevent the base plate from being tilted up beyond a predetermined threshold tilt angle and prevent the base plate from being tilted down beyond a predetermined threshold tilt angle.

7. An apparatus for testing display modules, comprising:
a base plate configured for holding at least one display module;
a signal generating device, configured to be electrically connectable to the at least one display module; and
a device for adjusting a tilt angle of the base plate from a stable starting position, the device comprising:
two side walls being parallel to and spaced apart from each other, each side wall comprising a pivot hole, and the base plate disposed between the two side walls and pivotally attached to the side walls via the pivot holes; and
a plurality of magnetism members disposed on the base plate and the side walls, respectively, the magnetism members configured for holding the base plate stably in the starting position and further configured to allow the base plate to be displaced from the starting position by manual pressure applied to the base plate, such that a tilt angle of the base plate relative to the two side walls is adjustable up or down as desired.

8. The apparatus as claimed in claim 7, wherein each of the side walls comprises two of the magnetism members thereat, and the magnetism members at the side wall are spaced apart from each other.

9. The apparatus as claimed in claim 8, wherein the pivot hole of each of the side walls is formed at a middle portion of the side wall between the two magnetism members.

10. The apparatus as claimed in claim 9, wherein the base plate comprises other of the magnetism members, said other of the magnetism members corresponding to the magnetism members of the side walls.

11. The apparatus as claimed in claim 8, wherein each of the side walls further comprises two blocks under the corresponding magnetism members respectively, the blocks being nearer to a bottom edge of the side wall than the corresponding magnetism members.

12. The apparatus as claimed in claim 11, wherein the blocks are positioned and configured to prevent the base plate from being tilted up beyond a predetermined threshold tilt angle and prevent the base plate from being tilted down beyond a predetermined threshold tilt angle.

13. The apparatus as claimed in claim 7, further comprising a supporting plate disposed on the base plate.

14. The apparatus as claimed in claim 13, wherein the supporting plate comprises at least one recess configured for receiving the at least one display module.

15. The apparatus as claimed in claim 14, further comprising a pressing member provided above the supporting plate, a cylinder mechanism, and a switch, wherein the cylinder mechanism is drivably attached to the pressing member and slidably attached to the base plate such that the cylinder mechanism can drive the pressing member toward the supporting plate and cause the pressing member to hold the supporting plate on the base plate, and the switch is electrically connected to the cylinder mechanism and configured to activate the cylinder mechanism.

16. The apparatus as claimed in claim 7, wherein the signal generating device comprises a signal output device configured for transmitting testing signals to the at least one display module.

* * * * *